United States Patent [19]

Kobayashi et al.

[11] Patent Number: 4,842,943
[45] Date of Patent: Jun. 27, 1989

[54] UNITARY MOLDED SILICONE RUBBER PRODUCT FROM TWO DIFFERENT SILICONE RUBBERS AND A METHOD FOR THEIR MANUFACTURE

[75] Inventors: Hideki Kobayashi; Hiroshi Honma, both of Ichihara; Mitsuo Hamada, Kisurazu, all of Japan

[73] Assignee: Toray Silicone Company, Ltd., Tokyo, Japan

[21] Appl. No.: 87,571

[22] Filed: Aug. 20, 1987

Related U.S. Application Data

[63] Continuation of Ser. No. 447,588, Dec. 7, 1982, abandoned.

[30] Foreign Application Priority Data

Dec. 7, 1981 [JP] Japan .................................. 56-197139

[51] Int. Cl.$^4$ ............................ A01B 1/06; B32B 9/04
[52] U.S. Cl. .................................... 428/447; 428/408; 264/105
[58] Field of Search ................ 428/447, 408; 252/511; 264/105

[56] References Cited

U.S. PATENT DOCUMENTS 3,620,873  11/1971  Ehrreich et al. ............... 428/391 X
4,284,679   8/1981  Blad et al. ....................... 428/212 X

FOREIGN PATENT DOCUMENTS 4851334   1/1975  Japan .................................. 428/447

OTHER PUBLICATIONS

Kirk-Othmer, Encyclopedia of Chemical Technology, Third Edition, vol. 20, pp. 950 and 961, (1982).

Primary Examiner—Nancy A. B. Swisher
Attorney, Agent, or Firm—Roger H. Borrousch

[57] ABSTRACT

Molded silicone rubber unitary bodies of a carbon black containing portion and a portion containing substantially no carbon black which is obtained from a platinum catalyzed addition reaction composition are useful as keyboard pads, zebra-type connectors, and electrical joints. These molded bodies can be made by tightly contacting the uncured composition containing substantially no carbon black with a cured silicone rubber containing the carbon black and then heating to cure.

9 Claims, No Drawings

UNITARY MOLDED SILICONE RUBBER PRODUCT FROM TWO DIFFERENT SILICONE RUBBERS AND A METHOD FOR THEIR MANUFACTURE

This application is a continuation of Ser. No. 447,588, filed Dec. 7, 1982 now abandoned.

BACKGROUND OF THE INVENTION

1. Field of the Invention

This invention relates to a silicone rubber molded product in which a portion of silicone rubber contains 5 to 75 wt % carbon black and a portion of silicone rubber contains substantially no carbon black are united together. This invention also relates to a method for producing this silicone rubber molded product.

2. Description of the Prior Art

Silicone rubber molded products in which the cured body has a portion of silicone rubber containing carbon black and a portion of silicone rubber containing substantially no carbon black has been widely used as two-color keyboard pads, zebra-type connectors, and electrical joints for various types of electrical appliances.

An improved method for producing this type of silicone rubber molded product was disclosed in Japanese Patent Publication No. Sho 56 [1981]-41417, published Sept. 28, 1981, in the names of Sado et al. In this method, an organic peroxide is added to unvulcanized silicone rubber containing carbon black and a conductive silicone rubber cured body is formed by hot compression molding. Subsequently, an organic peroxide is also added to an insulating unvulcanized silicone rubber containing substantially no carbon black and molded along with the above-mentioned cured body by hot compression molding. As a result, a silicone rubber molded product is formed in which a portion of the conductive silicone rubber cured body are united together.

However, because carbon black included in the conductive silicone rubber tends to cause vulcanization inhibition with the organic peroxide, the applicable organic peroxides are limited to dicumyl peroxide, di-t-butyl peroxide, 2,5-dimethyl-2,5-di-(t-butylperoxy)hexane. When these organic peroxides which are less likely to be influenced by vulcanization inhibition with carbon black, are used, the following drawbacks occur. Although the mold temperature is set at a high temperature (i.e. 150° C. or higher, or 170° C. or higher), molding must be continued for 3 to 4 minutes or 10 minutes or more, resulting in increased consumption of electrical power and poor production efficiency. The surface of silicone rubber results in curing inhibition due to the air trapped in the gap between the mold and silicone rubber. Moreover, because foaming occurs when hot air vulcanization is carried out, the method of vulcanization is limited.

Ehrreich and Reti in U.S. Pat. No. 3,620,873, issued Nov. 16, 1971, describe making plastic members of electrically conductive or thermally conductive sheets or strips and non-conductive areas.

SUMMARY OF THE INVENTION

The inventors earnestly conducted the present study in an attempt to overcome the drawbacks of the conventionally known silicone rubber molded product and its manufacturing method. As a result, a curing mechanism which was difference from that in the conventional methods was employed. This invention was achieved without the above-mentioned drawbacks. That is, a silicone rubber molded product was formed in which a portion of the silicone rubber cured body containing carbon black and a portion of the silicone rubber cured body substantially containing no carbon black are united together, and the method for producing this product was established.

This invention relates to a molded product consisting essentially of a portion of silicone rubber containing 5 to 75 weight percent carbon black based on the total weight of the silicone rubber, and a portion of silicone rubber containing substantially no carbon black and in which both portions of silicone rubber are obtained from an addition reaction using a platinum catalyst, said portions are united together forming a unitary body.

This invention also relates to a method for making a molded product comprising contacting tightly (A) an unvulcanized curable silicone rubber composition containing a platinum catalyst and substantially no carbon black and which cures by an addition reaction using the platinum catalyst with (B) a cured silicone rubber containing 5 to 75 weight percent carbon black and which is obtained from an addition reaction using a platinum catalyst and then heating to cure the unvulcanized composition forming a unitary body from (A) and (B).

DETAILED DESCRIPTION OF THE INVENTION

The portion of the silicone rubber cured body containing 5 to 75 wt % of carbon black are of the addition reaction curing type and contain 5 to 75 wt % of carbon black. In the case of room temperature/moisture curing type, it may inhibit curing of the addition reaction curing type silicone rubber using a platinum catalyst if a certain type of curing acceleration catalyst is used and the organic peroxide vulcanization type also inhibit cure. In view of the facts that the curing temperature can be lower than peroxide curing silicone rubber compositions and the curing time can be reduced, the addition reaction curing type silicone rubber using a platinum catalyst is preferred.

The major components of the addition reaction curable silicone rubber are as follows: organopolysiloxanes which are available in liquid form or gum form at ambient temperature and which contain at least two alkenyl groups per molecule e.g. vinyl and allyl groups, examples of such organopolysiloxanes being dimethylpolysiloxane with dimethylvinylsilyl groups at both ends, dimethylsiloxane/ methylvinylsiloxane copolymer with dimethylvinylsilyl groups at both ends, and dimethylsiloxane/methylphenylsiloxane/ methylvinylsiloxane copolymer with dimethylvinylsilyl groups at both ends; organohydrogenpolysiloxanes which are available in liquid form e.g. methylhydrogenpolysiloxane with trimethylsilyl groups at both ends, dimethylsiloxane/ methylhydrogensiloxane copolymer with trimethylsilyl groups at both ends and tetramethyltetrahydrogencyclotetrasiloxane; carbon black and a platinum catalyst for the addition reaction e.g. platinum black, platinum sponge, platinum chloride (II), chloroplatinic acid, a reaction product between chloroplatinic acid an a monohydric alcohol, a complex between chloroplatinic acid and an olefin, a complex between chloroplatinic acid and vinylsiloxane, platinum bisacetylacetonate, palladium catalysts and rhodium catalysts. In many cases the aforementioned reinforcement fillers and addition reaction rate retardants e.g. organonitrogen compounds, alkyne compounds, and tin compounds may be included. If desirable, auxilary materials such as bulk fillers, surface treatment agents for the reinforcement fillers, conductive fibers, conductive metals or metal oxides, heat resisting agents, and dyes may be included.

Carbon black is present in an amount of 5 to 75 weight percent in the silicone rubber. If it is less than 5 weight percent, the united state between the portion of the silicone rubber cured body and the portion of the silicone rubber cured body containing substantially no carbon black which is curable in the addition reaction using a platinum catalyst is insufficient, namely, the bonding strength is insufficient or bonding is poor. If it exceeds 75 weight percent, the blending workability and molding workability are impaired.

Examples of types of carbon black are channel black, furnace black, thermal black, and acetylene black. So as to improve the bonding strength between the aforementioned two types of cured bodies, a pH value based on item 5, 5 in JIS K 6221 is preferable 3.0 or greater and more preferably pH 4.0 to 9.5. When the silicone rubber molded product of this invention is used for electrical joints, the above-mentioned carbon black is preferably selected from the conductive grade. The conductive grade is often found in furnace black and acetylene black. Preferably the carbon black is the conductive grade in an amount of from 10 to 50 weight percent.

The silicone rubber cured body containing 5 to 75 weight percent of carbon black is molded in the following manner. The aforementioned major components and if desirable, auxiliary materials, are blended to homogeneity. In the case of solid addition reaction curable silicone rubber using a platinum catalyst, molding is accomplished by compression molding or extrusion molding (hot air vulcanization). In the case of liquid or paste form silicone rubber, molding is accomplished by compression molding, injection molding, transfer molding, or extrusion molding (hot air vulcanization). The vulcanization temperature and time are selected appropriately according to the types and amount so addition of vulcanization agents or curing catalysts as well as type of vulcanization or molding method. In the case of the addition reaction curable type using a platinum catalyst, vulcanization or molding can be carried out at a low temperature for a short time in any of these molding methods compared to the case of the organic peroxide vulcanization type e.g. 1 minute at 100° C., 40 seconds at 120° C. and 20 seconds at 150° C. Unlike the case involving the organic peroxide vulcanization type, the secondary vulcanization in a hot air oven is not necessary. Thus, it is advantageous in terms of energy conservation and greater productivity. On the other hand, organic peroxide vulcanization type silicone rubber are molded by compression molding which is generally carried out at 110° C. to 200° C. for more than 5 minutes and extrusion molding (hot air vulcanization) is carried out at 300° C. to 550° C. for a few minutes to a few tenths of a second.

The configuration of the silicone rubber cured body containing 5 to 75 weight percent of carbon black is selected appropriately according to the usages of the silicone rubber molded product of this invention.

The silicone rubber cured body substantially containing no carbon black which is curable in the addition reaction using a platinum catalyst is literally formed at room temperature or by heat curing of a silicone rubber composition containing substantially no carbon black which is curable in the addition reaction using a platinum catalyst. In this case, both cured bodies are united when the silicone rubber composition is cured in a tightly contacted state with the previously molded silicone rubber cured body containing 5 to 75 weight percent of carbon black. As a result, the desired silicone rubber molded product is formed.

The silicone rubber containing substantially no carbon black which is curable in the addition reaction using a platinum catalyst contains only the platinum addition reaction catalysts unlike the addition reaction curable silicone rubber containing 5 to 75 weight percent of carbon black. In addition with the exclusion of the condition that carbon black be not substantially added, the silicone rubber consists of the same major components and auxiliary materials which are added in many cases or when desired. Both major components and auxiliary materials are the same as those mentioned in the case of addition reaction curable silicone rubbers for the formation of silicone rubber cured body containing 5 to 75 weight percent of carbon black. In terms of improvement in the bonding strength between two cured bodies, both organohydrogenpolysiloxane and organopolysiloxane are compounded preferably in such a proportion that the molar ratio of the Si-bonded hydrogen atoms in the organohydrogenpolysiloxane to the Si-bonded alkenyl groups in the organopolysiloxane containing at least two alkenyl groups per molecule ranges from 0.8/1 to 6/1.

The condition stating "containing substantially no carbon black" means that carbon black is not added at all or a very small amount such as 1 to 2 weight percent or less which is required for coloring or flame retardation may be added.

The types of molding methods used when the addition reaction curable silicone rubber using a platinum catalyst is in contact with the silicone rubber cured body containing 5 to 75 weight percent of carbon black are preferably compression molding, injection molding, and extrusion molding (hot air vulcanization) when the organopolysiloxane containing at least two alkenyl groups per molecule is supplied in the gum form. The preferable molding methods are compression molding, injection molding, transfer molding, and extrusion molding (hot air vulcanization) when the organopolysiloxane containing at least two alkenyl groups per molecule is supplied in the liquid form. In terms of production efficiency, injection molding is preferable. In the molding system in which a silicone rubber is in contact with a mold as in compression molding, injection molding, and transfer molding, a sufficiently cured silicone rubber body can be obtained with the following curing temperature and time: 1 minute at 100° C., 40 seconds at 120° C., 20 seconds at 150° C., and 15 seconds at 170° C. In the case of hot air vulcanization, sufficient curing can be carried out with the following curing temperature and time: a few tenths of a second to a few seconds at 300°–550° C. In this case, the silicone rubber cured body containing substantially no carbon black is strongly bonded to the silicone rubber cured body containing 5 to 75 weight percent of carbon black.

The silicone rubber molded product of this invention in which a portion of the silicone rubber cured body containing 5 to 75 weight percent of carbon black and a portion of the silicone rubber cured body containing substantially no carbon black which is curable by the addition reaction using a platinum catalyst are united together and have the characteristic that both cured bodies are strongly bonded together and form a unitary body. When an addition reaction curing type silicone rubber is used as a silicone rubber for forming a portion of the silicone rubber cured body containing 5 to 75 weight percent of carbon black, both surface and interior are cured uniformly; thus, the curing of the silicone rubber surface is not inhibited by the air trupped in the gap between the mold and the silicone rubber and the hot air in the case of hot air vulcanization.

According to the method of this invention for producing a silicone rubber molded product, the silicone rubber molded porduct in which a portion of the silicon rubber cured body containing 5 to 75 weight percent of carbon black and a portion of the silicone rubber cured body containing substantially no carbon black which is curable by the addition reaction using a platinum catalyst are united together can be produced at a lower temperature in a shorter time compared to the conventional method using an organic peroxide. That is, the desired silicone rubber molded product can be produced with less electrical power consumption. In addition, not only compression molding but various molding methods such as injection molding, transfer molding, and extrusion molding can also be used efficiently.

The silicone rubber molded product of this invention is useful for conductive rubber parts in various types of electrical and electronic appliances. In particular, it is useful for electrical joints.

This invention will be explained in detail in the following examples. "Parts" indicated in the examples means "parts by weight." The viscosity is the value measured at 25° C.

EXAMPLE 1

Dimethylpolysiloxane with dimethylvinylsilyl groups at both ends (average degree of polymerization 320, 100 parts) and Ketjenblack EC (conductive furnace black by Lion Akuzo K.K., 15 parts) were blended homogeneously, and dimethylsiloxane/methylhydrogensiloxane copolymer with trimethylsilyl groups at both ends, (1.8 parts, 50 mol % dimethylsiloxane units, 50 mol % methylhydrogensiloxane units, viscosity 5 cst), an isopropanol solution of chloroplatinic acid (platinum content 0.35 wt %, 1.0 parts) and methylbutynol (0.05 parts) were added. The mixture was blended to homogeneity and introduced into an injection molding machine in which the degassing treatment was carried out. Injection molding was carried out at 150° C. for 20 seconds under an injection pressure of 40 kg/cm$^2$. As a result, a silicone cured body containing 12.9 wt % of conductive furnace black was obtained.

Subsequently, a liquid silicone rubber was prepared by using the same composition as in the above-mentioned addition reaction curable silicone rubber containing a platinum catalyst except that fumed silica treated for hydrophobization (15 parts, specific surface are 130 m$^2$/g) was added instead of Ketjenblack EC. The liquid silicone rubber prepared above was injected into an injection molding machine in which the degassing treatment was carried out. The injection molding was carried out at 150° C. for 20 seconds under an injection pressure of 40 kg/cm$^2$ in a mold in which the above-mentioned silicone rubber cured body containing 12.9 wt % of conductive furnace black had been placed. As a result, a silicone rubber molded product was obtained in which the portion of the silicone rubber cured body containing 12.9 wt % of conductive furnace black and the portion of the silicone rubber cured body containing 12.9 wt % of fumed silica which had been treated for hydrophobization were united together. The surface of this molded product was very smooth and both surface and interior were cured homogeneously.

Both cured bodies were held with a jig in a tensile strength tester and the tensile strength was measured. Fracture occurred in the portion of the silicone rubber cured body containing 13 wt % of conductive furnace black, and no breaks were made in the boundary surface. The fracture tensile strength was 18 kg/cm$^2$.

As a comparative example, molding was carried out in reversed order. The portion of the silicone rubber cured body containing 12.0 wt % of conductive furnace black was not bonded at all to the portion of the silicone rubber cured body containing 12.9 wt % of fumed silica which had been treated for hydrophobization; thus, a united molded product was not obtained.

Moreover, this above-mentioned silicone cured body containing 12.9 wt % of fumed silica which had been treated for hydrophobization was molded at first and placed in a mold in the injection molding machine. A liquid silicone rubber containing 12.9 wt % of fumed silica which had been treated for hydrophobization was injection molded in the same mold at 150° C. for 20 seconds under an injection pressure of 40 kg/cm$^2$. Both cured bodies were not bonded at all; thus, a united molded product was not obtained.

EXAMPLE 2

A copolymer gum consisting of 99.8 mol % dimethylsiloxane units and 0.2 mol % methylvinylsiloxane unit (100 parts) and Denka Black (70 parts, conductive acetylene black by Denki Kagaka Kogyo K.K.) were blended homogeneously. Subsequently, the same dimethylsiloxane/ methylhydrogensiloxane copolymer (0.4 parts) and isopropanol solution of chloroplatinic acid (0.1 parts) as used in Example 1 were added, and the mixture was thoroughly blended and injected into a mold. Compression molding was carried out at 100° C. for 2 minutes under a pressure of 100 kg/cm$^2$. As a result, a silicone cured body containing 41.0 2wt % of Denka Black was obtained. This cured body was injected into another mold along with the same addition reaction curable silicone rubber containing 28.6 wt % of wet silica and compression molded at 120° C. for one minute under a pressure of 100 kg/cm$^2$. As a result, a silicone rubber molded product was obtained in which the portion of the silicone rubber cured body containing 41.0 wt % of Denka Black and the portion of the silicone cured body containing 28.6 wt % of wet silica were united together.

COMPARATIVE EXAMPLE 1

A silicone rubber consisting of the copolymer gum as described in Example 2 (100 parts), wet silica (50 parts) and dicumyl peroxide (1.5 parts) was molded under the same conditions as in the case of the silicone rubber containing acetylene black. The above-mentioned silicone rubber containing 28.6 wt % of wet silica, which was curable in the addition reaction was compression molded at 120° C. for one minute under a pressure of 100 kg/cm$^2$. Both cured bodies at not bonded at all; thus, a united molded product was not obtained.

That which is claimed is:

1. A molded product consisting essentially of a portion of silicone rubber containing 5 to 75 weight percent carbon black based on the total weight of the silicone rubber, and a portion of silicone rubber containing substantially no carbon black and in which both portions of silicone rubber are obtained from an addition reaction using a platinum catalyst, said portions are united together forming a unitary body.

2. The molded product according to claim 1 in which the silicone rubber portion containing the carbon black contains 10 to 50 weight percent conductive grade carbon black.

3. The molded product according to claim 1 in which the unitary body is a two-color keyboard pad.

4. The molded product according to claim 1 in which the unitary body is a zebra-type connector.

5. The molded product according to claim 2 in which the unitary body is a two-color keyboard pad.

6. The molded product according to claim 2 in which the unitary body is a zebra-type connector 7. The molded product according to claim 1 in which the unitary body is an electrical joint.

8. The molded product according to claim 2 in which the unitary body is an electrical joint.

9. A method for making a molded product comprising contacting tightly (A) an unvulcanized, curable silicone rubber composition containing a platinum catalyst substantially no carbon black and which cures by an addition reaction using the platinum catalyst with (B) a cured silicone rubber containing 5 to 75 weight percent carbon black and which is obtained from an addition reaction using a platinum catalyst and then heating to cure the unvulcanized composition forming a unitary body from (A) and (B).

* * * * *